No. 682,674. Patented Sept. 17, 1901.
S. C. DAVIDSON.
FURNACE.
(Application filed Sept. 17, 1900.)
(No Model.) 9 Sheets—Sheet 1.

WITNESSES: INVENTOR:
Fred White, Samuel Cleland Davidson,
Thomas F. Wallace By his Attorneys:

No. 682,674. Patented Sept. 17, 1901.
S. C. DAVIDSON.
FURNACE.
(Application filed Sept. 17, 1900.)
(No Model.) 9 Sheets—Sheet 2.

Fig.3.

WITNESSES: INVENTOR:
Samuel Cleland Davidson,
By his Attorneys

No. 682,674. Patented Sept. 17, 1901.
S. C. DAVIDSON.
FURNACE.
(Application filed Sept. 17, 1900.)
(No Model.) 9 Sheets—Sheet 3.

Fig. 4.

WITNESSES: INVENTOR:
Samuel Cleland Davidson,
By his Attorneys:

No. 682,674. Patented Sept. 17, 1901.
S. C. DAVIDSON.
FURNACE.
(Application filed Sept. 17, 1900.)

(No Model.) 9 Sheets—Sheet 4.

WITNESSES: INVENTOR:
Fred White Samuel Cleland Davidson
Thomas S. Wallace By his Attorneys No. 682,674. Patented Sept. 17, 1901.
S. C. DAVIDSON.
FURNACE.
(Application filed Sept. 17, 1900.)

(No Model.) 9 Sheets—Sheet 5.

WITNESSES:
Fred White
Thomas F. Wallace

INVENTOR:
Samuel Cleland Davidson,
By his Attorneys
Arthur C. Fraser

No. 682,674.  
S. C. DAVIDSON.  
FURNACE.  
(Application filed Sept. 17, 1900.)

Patented Sept. 17, 1901.

(No Model.)

WITNESSES:

INVENTOR:
Samuel Cleland Davidson,
By his Attorneys:

No. 682,674. Patented Sept. 17, 1901.
S. C. DAVIDSON.
FURNACE.
(Application filed Sept. 17, 1900.)

(No Model.) 9 Sheets—Sheet 7.

WITNESSES: INVENTOR
Fred White Samuel Cleland Davidson,
Thomas S. Wallace By his Attorneys

THE NORRIS PETERS CO., PHOTO-LITHO., WASHINGTON, D. C.

No. 682,674. Patented Sept. 17, 1901.
S. C. DAVIDSON.
FURNACE.
(Application filed Sept. 17, 1900.)
(No Model.) 9 Sheets—Sheet 8.

WITNESSES:
INVENTOR:
Samuel Cleland Davidson,
By his Attorneys:

No. 682,674.

Patented Sept. 17, 1901.

S. C. DAVIDSON.

FURNACE.

(Application filed Sept. 17, 1900.)

(No Model.)

WITNESSES:

INVENTOR:

Samuel Cleland Davidson,

By his Attorneys:

UNITED STATES PATENT OFFICE.

SAMUEL CLELAND DAVIDSON, OF BELFAST, IRELAND.

FURNACE.

SPECIFICATION forming part of Letters Patent No. 682,674, dated September 17, 1901.

Application filed September 17, 1900. Serial No. 30,347. (No model.)

*To all whom it may concern:*

Be it known that I, SAMUEL CLELAND DAVIDSON, merchant, of Sirocco Engineering Works, Belfast, Ireland, have invented certain new and useful Improvements in Furnaces, of which the following is a specification.

My invention has reference to improvements in furnaces, and more particularly to improvements in the construction of furnace fronts and doorways for steam-boilers and other furnaces in combination with an improved system of air-supply thereto.

One object of my invention is to insure better combustion of the fuel, smoke, and fire-gases in said furnaces without at the same time diminishing the intensity of heat obtained therefrom or the steaming capacity of the boilers relatively to the weight of fuel consumed, which diminutions have hitherto usually been the serious drawback to the practical employment of smoke-consuming appliances. Also when the air to support combustion is supplied to the fuel as a forced blast a further object of my invention is to minimize and practically prevent the tendency to outblast of flame, smoke, and gases from the furnace-door when opened, and particularly when fresh coal is thrown onto the fire, without having to previously shut off said forced blast.

A further important object of my invention is also to keep the furnace fronts and doors comparatively cool, so that the almost unbearable heat hitherto usual in, for instance, the stokeholds of steamships, and which is due mainly to the strong radiation of heat from the nearly red-hot furnace fronts and doors, may be obviated and the resulting inconvenience to the stokers working therein may be lessened considerably.

In carrying my invention into effect I construct the furnace fronts and doorways of said boilers or other furnaces with a hollow chamber (hereinafter called the "air-chamber,") formed around the furnace-doorway and over the top and on each side of the ash-pit doorway. One or more openings are provided in said air-chamber for inflow of the air-supply thereto, which may be drawn direct from the atmosphere either by the action of chimney suction or of a fan-exhaust operating on the furnaces or driven in under pressure as a forced blast through air-tubes from a fan or other air-propelling device or by steam-jets so employed as to create a strong induced air-draft into the furnace-fronts. In said air-chamber the surfaces which are toward the fire and ash-pit have two series of air-jet orifices for admitting the air thereto as jets, one of which series (hereinafter called the "furnace-jets") communicates with the combustion chamber or space above the top surface of the fire, while the other series (hereinafter called the "ash-pit jets") communicates with the ash-pit or inclosed space below the fire-bars. The total area of the series of furnace-jets is so proportioned relatively to that of the ash-pit jets that the volume of air admitted or forced in through the former into the combustion chamber or space above the top surface of the fire and onto said top surface is sufficient to fully complete the combustion of the gases produced by the volume of air admitted through the ash-pit jets and passing up through the fuel and remains uniformly so, no matter how the strength of the chimney-draft or forced blast may vary. Consequently in my improved furnace the rate of combustion of the fuel itself and the steaming capacities of the boiler can in practice be increased or diminished to almost any extent by merely adjusting the operative strength of the chimney or suction draft or of the forced blast employed therewith without any less complete combustion of the smoke or loss in the evaporative efficiency of the fuel. The surfaces of the air-chamber which are directly exposed to the radiant heat of the fire become thereby very hot and radiate a portion of their heat to the outer sides of the air-chamber, which are facing the stokers; but the air passing through the air-chamber absorbs this heat to a great extent, and consequently becomes heated before entering the furnace, and as it is important toward obtaining good ignition and combustion of the smoke and gases in the furnaces that the air admitted or forced into the top surface of the fire be considerably heated I construct the orifices for the furnace-jets in the form of short tubes (hereinafter called the "blowpipes") of a length several times greater than their diameter, and I preferably cast or fix the same into the surfaces of the air-chamber which are directly exposed to the radiant heat of the fire and project them therefrom into the upper interior of the air-chamber, so that the air around said blowpipes in addition to the heat absorbed by it from the air-chamber sides is further heated by contact with the exterior surfaces of the blowpipes and in its further passage through their interior attains a still higher temperature before being discharged therefrom as jets over the top surface of the fire. The said blowpipes are also so arranged as to direct the air-jets therefrom into the parts of the furnace where their action will be most effective for completing the combustion of the gases and smoke, either by arranging the surfaces of the air-chamber which are exposed to the fire at such an angle or angles relatively to the axis of the fire that when the blowpipes are cast or fixed into said surfaces at right angles thereto the blowpipes will give a converging direction to the air-jets therefrom toward the center of the fire or when the surface of said air-chamber toward the fire is not angled by having the blowpipes themselves cast or fixed into said surfaces of the air-chamber at a suitable angle or angles thereto to thus similarly direct the air-jets. The ash-pit jets may consist merely of a series of orifices in the air-chamber surfaces directly facing the ash-pit, or they may be constructed as short blowpipes cast or fixed into same and projecting on either or both sides of said surfaces. As these surfaces are relatively much cooler than the surfaces which are directly exposed to the fire, the air-jets therefrom are consequently much cooler than the furnace-jets, and they have a cooling effect on the fire-bars, preventing them getting red-hot and warping or burning away. The heat which the air extracts from the bars in passing up between them raises its temperature to a sufficient degree before entering the incandescent fuel, and thus prevents its having any undue chilling effect thereon.

When the chimney or other exhaust draft operating on the furnace is sufficiently strong to produce the requisite inflow of air through said air-chamber to cause a sufficiently rapid combustion of the fuel, the air-supply inlets to the air-chamber are provided of large enough area to prevent any appreciable resistance to its admission, and with suitably strong suction-draft there is no tendency to outblast of flame through the open fire-doors when fresh coal is being thrown on the fire; but when a strongly-forced air-blast is used in the way that same has hitherto been ordinarily applied this tendency exists as a serious defect. Now in my herein-described improved furnace this defect is entirely obviated no matter what strength of forced blast be used therewith, as the direction given to the furnace-jets on each side and over the top of the furnace-doorway creates when the fire-door is opened an induced draft inward through the furnace-doorway of sufficient strength to prevent any outblast of flame and gases, even when the first shovelsful of fresh coal for upkeep of the fire are thrown in. The jets of air forced into the ash-pit being also directed inwardly thereto from over the top and near the sides of the ash-pit doorway, an induced draft is similarly produced inward through the ash-pit doorway when same has to be opened for removing the ashes and prevents blow-out of dust and ashes through the doorway while the operation of raking out the ashes is being performed.

Reference to the accompanying drawings will more fully explain the nature of my invention and how same is carried into effect.

Figures 1, 2, and 3 show one modification of my invention as applied to furnaces which are surrounded by metal plates or tubes having water on their outer sides, as in Lancashire, marine, or locomotive boilers. Figs. 9, 10, 11, and 12 show an alternative arrangement of my improved furnace-front for the water-tube type of boiler, but with the upper portion of the air-chamber toward the furnaces arranged as in Figs. 1, 2, and 3. Figs. 13, 14, and 15 show a further modification of my invention as applied to furnaces with brickwork sides and tops, such as bakers' ovens, reverberatory furnaces, &c., Fig. 13 being an exterior elevation of the air-chamber on the side toward the stokers.

Figure 1:
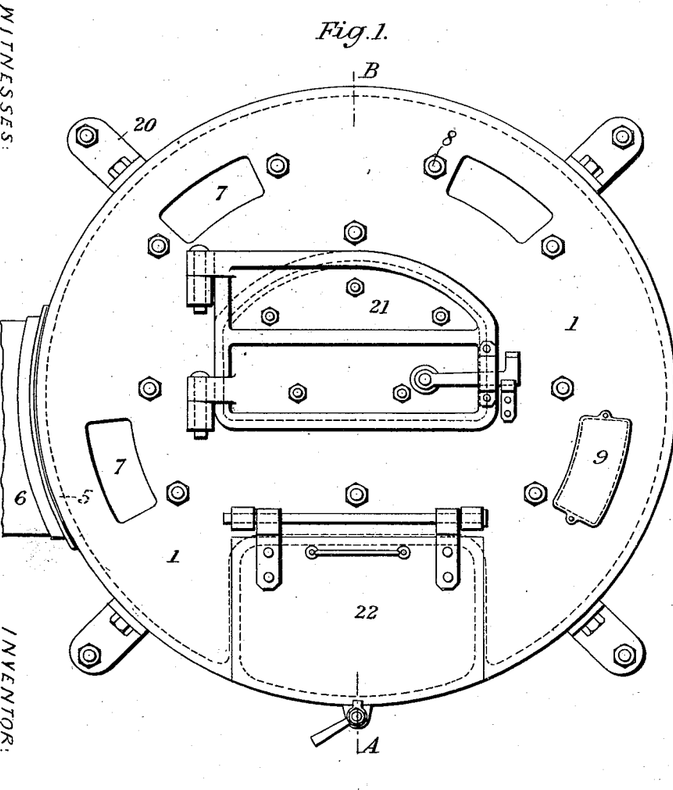
Fig. 1 is an exterior elevation of my improved furnace-front on the side toward the stokers.
Figure 2:
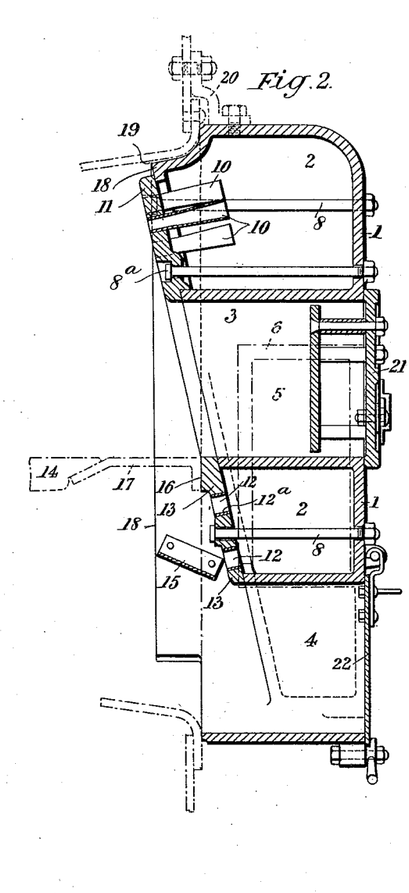
Fig. 2, a sectional side elevation on line A B of Fig. 1, and Fig. 3 an interior elevation of Figs. 1 and 2, showing the side of the furnace-front toward the furnace.
Figure 3:
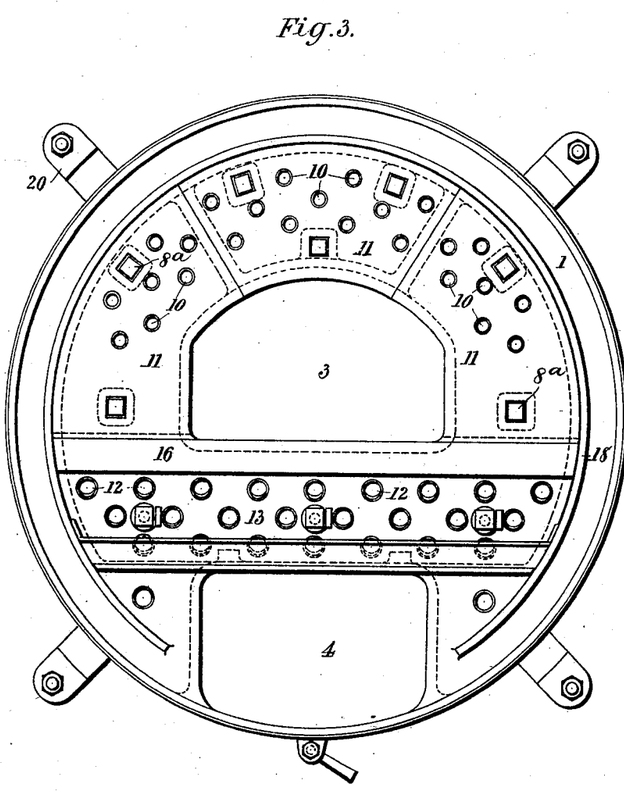

Referring to Figs. 1, 2, and 3, the furnace-front 1 is formed with an air-chamber 2, which extends at the top and sides of the furnace-doorway 3 and at the top and sides of the ash-pit doorway 4. The air-chamber 2 is provided with inlet-opening 5, which may be located anywhere around the furnace-front 1, so long as same is kept clear of ash-pit opening 5, and when forced draft is being used the inlet-opening 5 communicates with a fan or other air-propelling device by supply-pipe 6. 7 indicates hand-holes for obtaining access for fixing bolts 8 and may be fitted with movable plates 9; but these plates may be dispensed with when my improved front is put into operation with suction-draft only. 10 10 are the furnace-blowpipes to top surface of fire and project inwardly into air-chamber 2 and may be somewhat trumpet-shaped at inner end or their sides may be parallel. The blowpipes are mounted in the plates 11, forming the upper interior front of air-chamber, which is toward the furnace, (and hereinafter referred to as the "furnace-plate" 11.) The furnace-plate 11 is arranged with a forward inclination toward the furnace, the blowpipes 10 10 being mounted at right angles thereto, so as to effect the object of directing the air in converging jets into the center of the fire. Said furnace-plate 11 is built up of continuous segmental sections separate from the air-chamber (see Fig. 3) in order to facilitate the renewal of such plates as may become burned or cracked, the sections being held in position by means of the bolts 8, the heads $8^a$ of which are preferably sunk in the air-chamber and their ends secured by nuts in the ordinary way. This construction of furnace-plate effectually avoids the liability of breakage by reason of expansion or contraction due to intense or uneven heating of the plate. 12 represents the ash-pit-jet orifices, formed in a plate 13, forming the lower interior front of the air-chamber toward the ash-pit, (and hereinafter referred to as the "ash-pit plate" 13.) They are fitted with short blowpipes $12^a$, which are arranged at an angle relatively to the ash-pit plate 13, in which they are mounted, so as to deliver their air in a downward direction; but in order to obviate the tendency of the air to strike the bridge beneath the fire-bars 14 a deflector 15 is provided, which causes the air to be deflected upwardly toward the fire-bars. A facing 16 is formed on the ash-pit side of the plate 13, to which a dead-plate 17 is bolted. The circumferential sides of the air-chamber project at 18 into the furnace-flue of the boiler, a space 19 being left for cement to form an air-tight joint when the furnace-front is bolted by means of the exterior lugs or angle-pieces 20 to front plate of boiler. The firing-door 21 and ash-pit door 22 are of ordinary construction.

Figure 4:
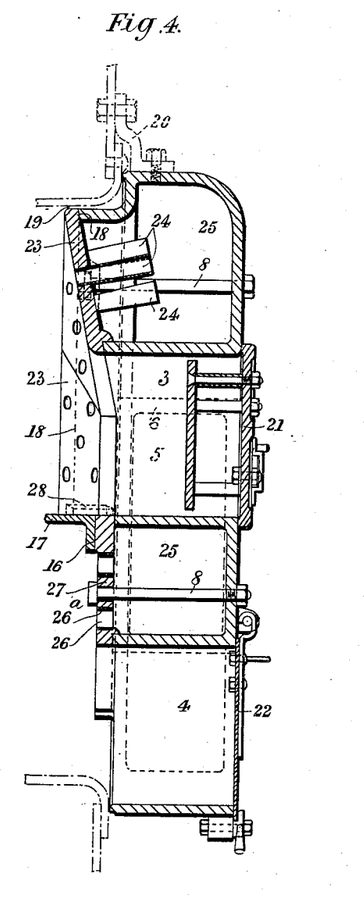
Fig. 4 is a sectional elevation of an alternative arrangement of my improved furnace-front for the above-mentioned type of boilers
Figure 5:
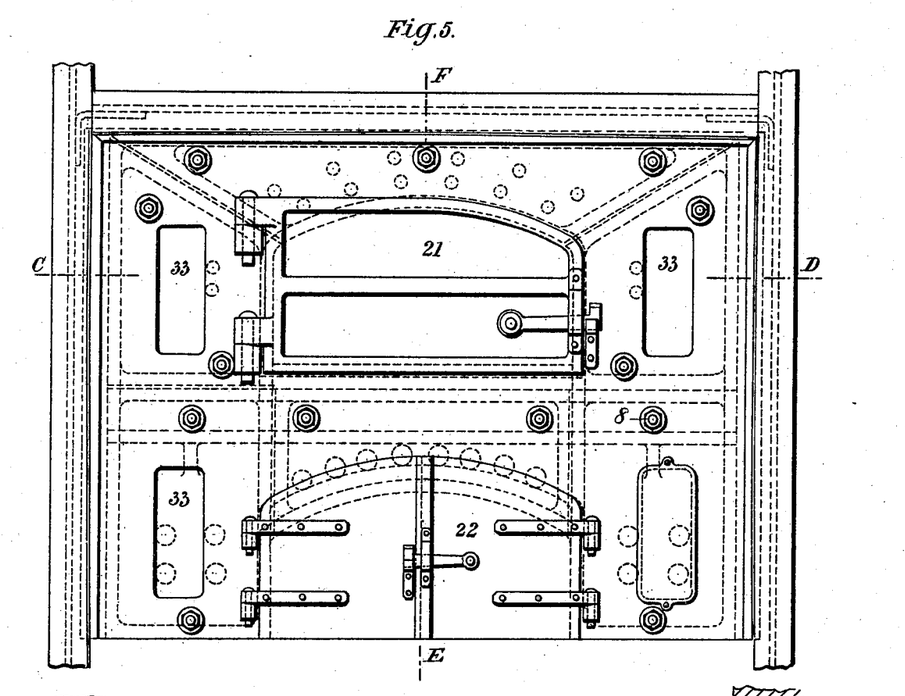
Figs. 5, 6, 7, and 8 show a further modification of my invention as applied to the furnaces of water-tube boilers, Fig. 5 being an exterior elevation of the furnace-front, Figs. 6 and 7 being a sectional plan and a sectional side elevation on the lines C D and E F, respectively, of Fig. 5, and Fig. 8 being an interior elevation of Fig. 5, showing the side of the air-chamber toward the furnace, one half with the furnace-plates 29 shown in position and the other half with the same removed.
Figure 6:
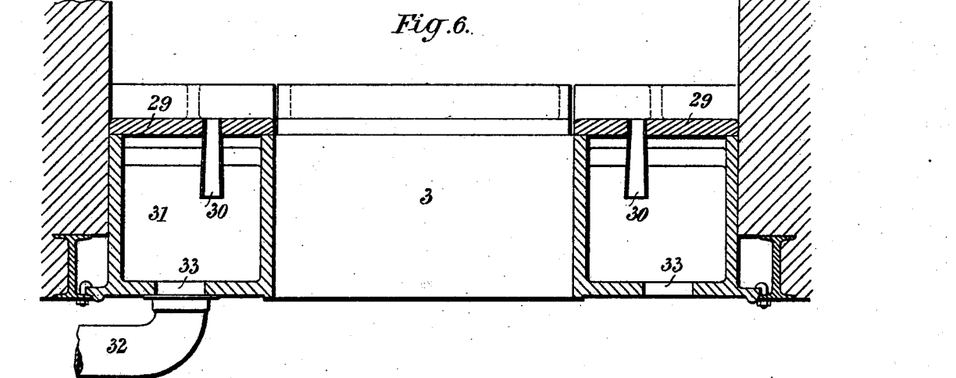
Figure 7:
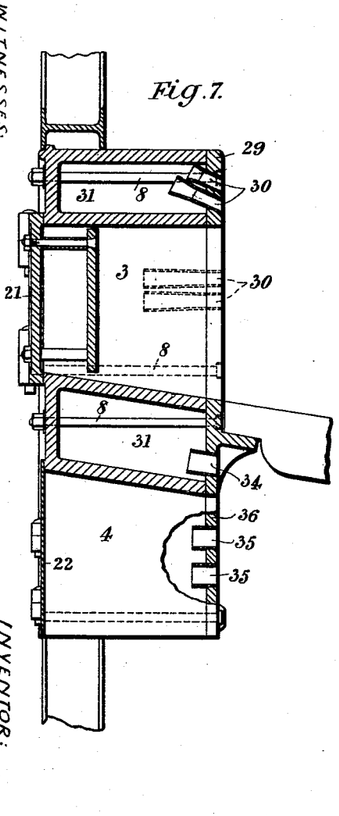
Figure 8:
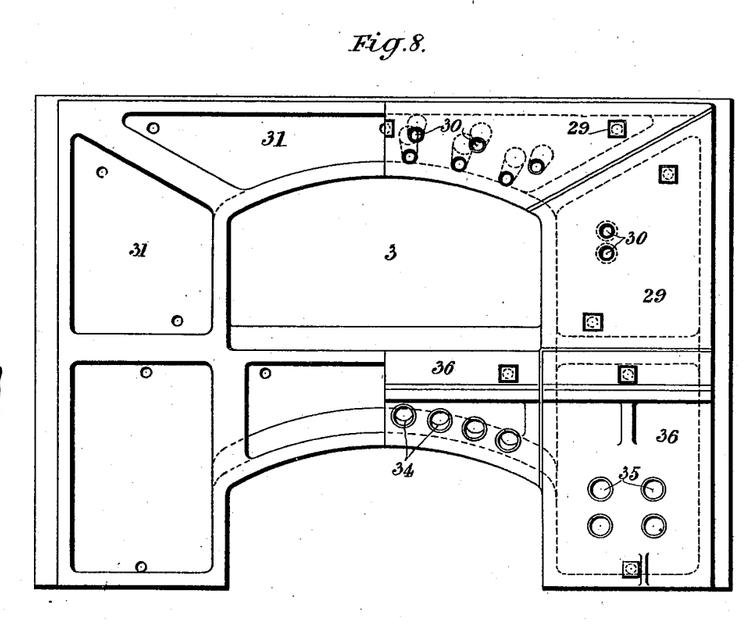
Figure 9:
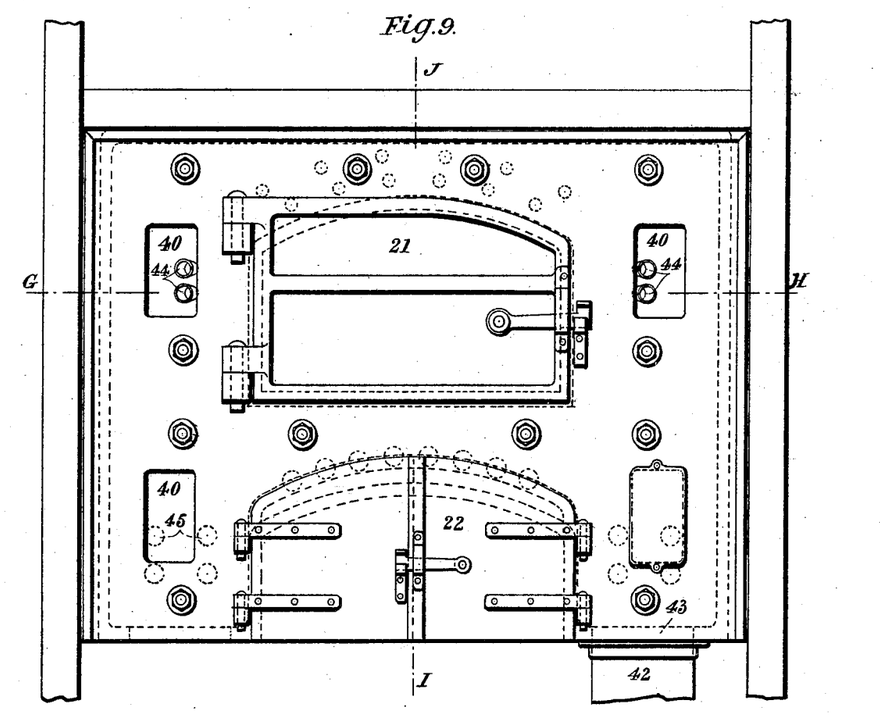
Fig. 9 is a front elevation.
Figure 10:
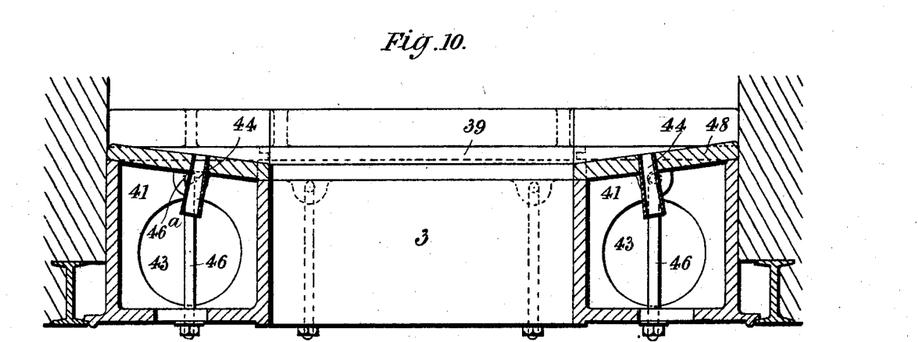
Fig. 10 is a horizontal section on the line G H of Fig. 9.
Figure 11:
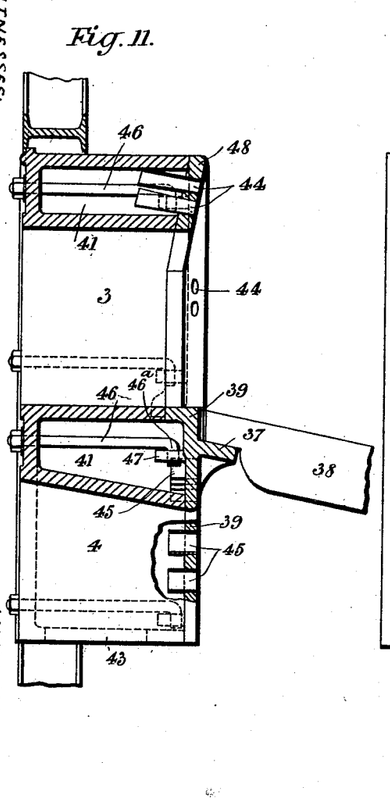
Fig. 11 is a sectional elevation on the line I J of Fig. 9.
Figure 12:
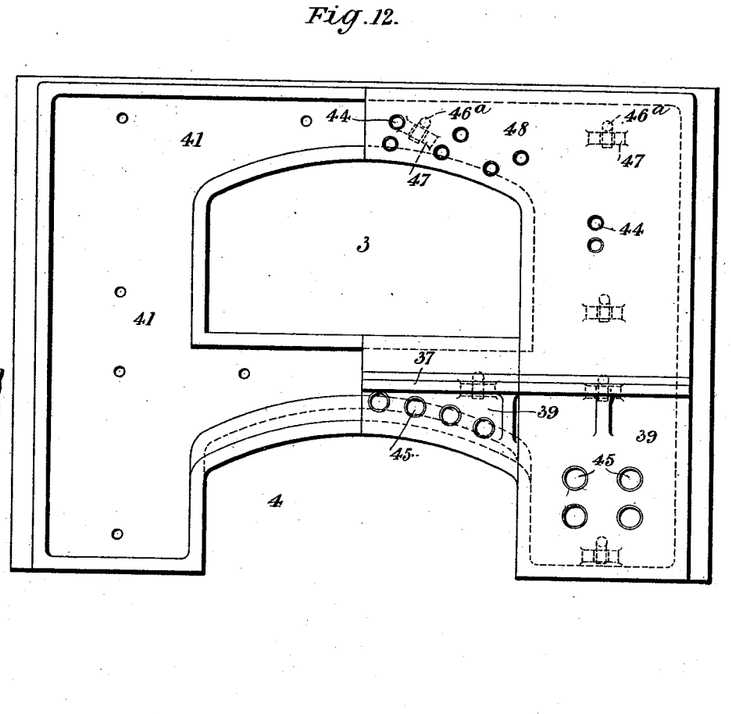
Fig. 12 is an inside rear elevation.

Fig. 4 shows an alternative arrangement of my improved furnace-front for the above-mentioned type of boilers in regard to the surfaces of the air-chamber which are exposed to the fire and in which the furnace-blowpipes are mounted, as also in regard to the arrangement of the ash-pit-jet orifices. In this arrangement the furnace-plate 23, in conjunction with the furnace-blowpipes 24, which are at right angles to the furnace-plate 23, are set at an angle to the axis of the fire, so as to direct the air passing through same in converging jets toward the center of the fire.

25 is the air-chamber. 26 indicates the ash-pit orifices, which may be fitted with short blowpipes $26^a$, mounted so as to project on one or both sides of the ash-pit plate 27, (which in this arrangement is vertical,) so that the air-jets are delivered in a horizontal direction into the ash-pit below the fire-grate bars. The bottom edges of the furnace-plate 23 rest upon the dead-plate 17, which is bolted to the facing 16, formed on the ash-pit side of the ash-pit plate 27. Dovetail recesses 28, formed in the plates, are filled with cement to prevent the escape of air through the joint.

In Figs. 5, 6, 7 and 8, which illustrate my invention as applied to furnaces of water-tube boilers of the Babcock & Wilcox and kindred types, the furnace-plate 29 is vertical and the blowpipes 30 mounted at an angle thereto, so as to direct the air passing through same as converging jets toward the center of the fire, as described in respect of Fig. 4. 31 is the air-chamber. 32 is the air-supply pipe, and 33 indicates the air-supply openings into the air-chamber. 34 indicates upper inclined ash-pit blowpipes, and 35 indicates lower horizontal ash-pit blowpipes, mounted in the vertical ash-pit plate 36. In the modification shown in Figs. 9 to 12, which illustrate an alternative arrangement for this type of boilers, a bracket 37, carrying the fire-bars 38, is mounted on the ash-pit plates 39. Four hand-holes 40 are provided, any one of which can be employed to conduct the air into the air-chamber 41 from supply-pipe 42 when forced draft is being used; but all may be utilized for air-supply when induced draft or chimney suction only is employed. 43 indicates inlet-openings into the air-chamber. 44 indicates the furnace-jet orifices or blowpipes, and 45 indicates the ash-pit-jet orifices or blowpipes. The retaining-bolts 46 have hooks $46^a$ on their inner ends, which hooks engage with eyebolts 47, cast on the ash-pit plates of the air-chamber. 48 is the furnace-plate. The method of attaching the furnace-front to boilers of this type will be seen by reference to Figs. 5 and 6.

Figure 13:
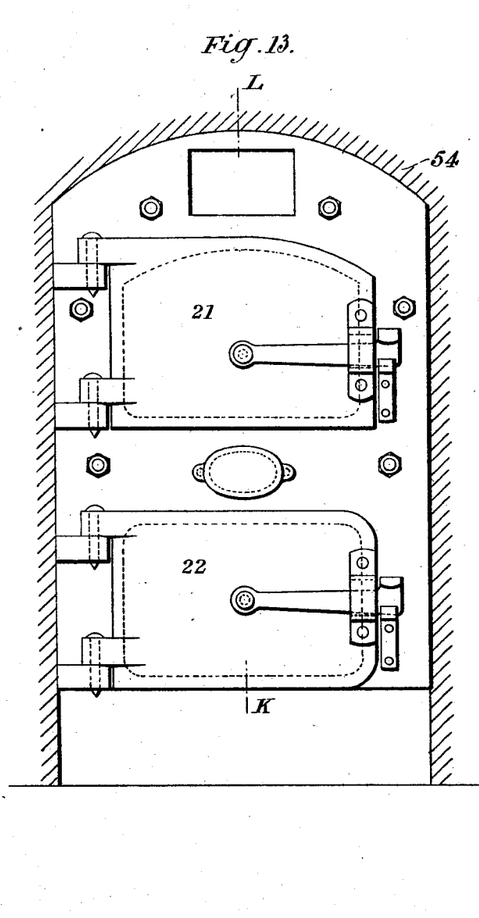
Figure 14:
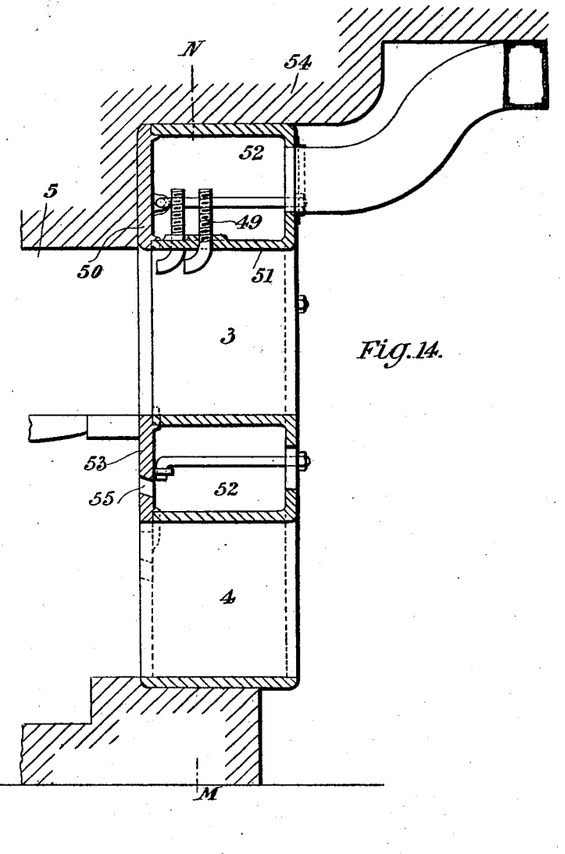
Fig. 14, a sectional elevation on the line K L of Fig. 13, and Fig. 15 a sectional elevation on the line M N of Fig. 14.
Figure 15:
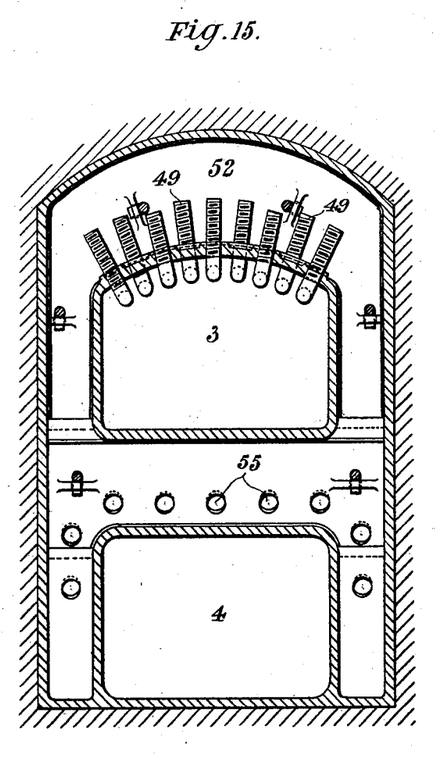

In the modification shown in Figs. 13 to 15, which illustrate my invention as applied to furnaces with brickwork sides and tops, such as bakers' ovens, reverberatory furnaces, &c., the furnace-blowpipes 49 are not fixed to the furnace-plates 50, but are screwed into the arched top 51 over the doorway 3 to the furnace, and they extend for a considerable distance inward into the air-chamber 52, and on the outer side thereof their ends are bent toward the furnace in order to direct the air-jets over the top surface of fire. The bolts which hold the ash-pit plates 53 and the furnace-plates 50 in position have hooks formed on their inner ends, which hooks engage with eyebolts cast on the ash-pit plates and furnace-plates. The furnace-fronts are built into the brickwork 54 of furnace, as shown. 55 indicates the ash-pit-jet orifices.

In furnaces with brickwork sides (as in some types of water-tube boilers, and in bakers' ovens, reverberatory furnaces, &c.) the red-hot bricks act on the fuel like a gas-retort, causing a very rapid liberation of gases therefrom, and consequently a proportionately larger quantity of air must be supplied to the top surface of the fire relatively to that introduced into the ash-pit than with furnaces surrounded by plates with water on the opposite side, (as in Lancashire, marine, and locomotive boilers, &c.) For furnaces of the first-above-mentioned types—i. e., with brickwork sides—I accordingly employ a total cross-sectional area in the furnace-jet orifices equal to about one-half of the area of the ash-pit-jet orifices, and for the furnaces of the second-above-mentioned types I usually adjust the total area of the furnace-jets to about one-third of that of the ash-pit jets, with which adjustments bituminous coal gives very efficient evaporative results and with practically no smoke. The actual areas of the air-jet orifices relatively to the areas of the fire-grate depend upon the strength of the induced draft operating on the furnace or on the air-pressure employed in the air-chamber when forced blast is used. In order to state some examples, however, I will assume that forced draft is being employed at an indicated pressure in the air-chamber of two inches on water-gage. In this case for each square foot of fire-grate in furnaces with brickwork sides, such as above referred to, I usually make the cross-sectional area of the furnace-jets to the proportion of three-quarter square inch to each square foot of fire-grate and the ash-pit jets to one and one-half square inches. For furnaces which are surrounded with metal plates or tubes having water on their other sides I usually make the cross-sectional area of the furnace-jets to a ratio of about five-eighths of a square inch to each square foot of fire-grate and the ash-pit jets to a ratio of about three square inches for bituminous coal. For anthracite or Welsh coal the cross-sectional area of the furnace-jets may be less than the above ratio per square foot of fire-grate. I do not, however, limit myself to the above-stated ratio. With mechanically-induced draft the proportionate areas of the jet-orifices should be somewhat larger relatively to the grate area than above recommended, and for natural chimney-draft, which is usually weaker than the mechanical draft, a still further enlargement of the air-jet orifices would be necessary; but the total cross-sectional area of the furnace-jets relatively to the ash-pit jets should remain as first above stated. The air within the air-chamber being all at an equal pressure, it will be evident that the relative areas of the furnace-jets and ash-pit jets will govern the relative volumes of air passing through same—that is to say, if the area of the air-jet orifices into the ash-pit is twice as large as that over the surface of the fires the volume of air passing through same into the ash-pits will be double of that passing into the combustion-chamber over top surface of the fire and through the blow-pipes, and these proportions will be automatically maintained throughout all variations of pressure or suction in the air-supply to or from the air-chamber. There is, however, apparently more resistance to the air entering the ash-pit, owing to its having to force its way up through the fuel; but this is counteracted by two other causes—first, the ash-pit orifices are short, being preferably mere holes in the sides of the air-chamber, or if fitted with blowpipes these are shorter and of larger diameter than the furnace blowpipes. Consequently the air in passing through same is very little further heated by contact therewith above the temperature attained in its passage between the interior surfaces of the air-chamber, whereas, on the contrary, the blowpipes to the top surfaces of the fire are of considerably-smaller diameter and greater length, whereby their resistance to the air passing through them is considerably greater. Further, owing to the high heat of the furnace blowpipes the air rapidly expands in its passage through same. Consequently the combined effect of these resistances just about counterbalances the resistance of the fuel to the ash-pit air. Hence the air-discharge into the ash-pit and over the fire may be taken as relatively proportional to the areas of the air-jet orifices.

What I claim, and desire to secure by Letters Patent, is—

1. In a furnace, a furnace-front having an air-supply chamber, the interior wall of which is provided with two series of orifices, those of one series arranged to admit air directly into the ash-pit, and those of the other series to admit air directly over the top of the fire, the total area of air-passage through the latter series being less by a fixed proportion than that through the former series, whereby without the employment of regulating-valves the relatively smaller volume of air admitted to the top surface of the fire remains in a constant proportion to that admitted to the ash-pit throughout all variations of pressure or draft.

2. In a furnace, a furnace-front having an air-supply chamber the interior wall of which is provided with two series of orifices, those of one series arranged to admit air directly into the ash-pit, and those of the other series to admit air directly over the top of the fire, the total area of air-passage through the respective series of openings being in a certain fixed proportion, whereby without the employment of regulating-valves the volume of air admitted to the top surface of the fire remains in a constant proportion to that admitted to the ash-pit throughout all variations of pressure or draft.

3. In a furnace, a furnace-front having an air-supply chamber the interior wall of which is provided with two series of orifices, those of one series arranged to admit air directly into the ash-pit, and those of the other series to admit air directly over the top of the fire, the total area of air-passage through the respective series of openings being in a certain fixed proportion, and unalterable, being without regulating-valves, whereby the volume of air admitted to the top surface of the fire remains in a constant proportion to that admitted to the ash-pit throughout all variations of pressure or draft.

4. In a furnace, a furnace-front having its interior wall formed with two series of orifices, those of one series arranged to admit air into the ash-pit, and those of the other series to admit air above the top of the fire, a series of tubes or blowpipes in said latter series of orifices, and forming air-heating surfaces, and means for feeding air through said blowpipes.

5. In a furnace, a furnace-front having an air-supply chamber, the interior wall of which is provided with two series of orifices, those of one series arranged to admit air directly into the ash-pit, and those of the other series to admit air directly over the top of the fire, the total area of air-passage through the latter series being less by a fixed proportion than that through the former series, whereby without the employment of regulating-valves the relatively smaller volume of air admitted to the top surface of the fire remains in a constant proportion to that admitted to the ash-pit throughout all variations of pressure or draft, and a series of tubes or blowpipes in said latter series of orifices, forming heating-surfaces for the air passing therethrough.

6. In a furnace, a furnace-front having an air-chamber within it, the inner wall of said chamber arranged above the bed of fuel, so as to expose it to the radiant heat of the fire, means for admitting air to said chamber, and a series of tubes or blowpipes extending into said chamber from its inner wall, whereby both the outer and inner sides of said tubes form heating-surfaces for the air.

7. In a furnace, a furnace-front having an air-chamber within it, the wall of said chamber being inclined at an angle to the axis of the fire, so as to expose it to the radiant heat of the fire, and a series of tubes or blowpipes mounted in said inclined wall at substantially right angles thereto, and extending within said chamber.

8. In a furnace, a furnace-front having an air-supply chamber, the interior wall of which is provided with two series of orifices, those of one series arranged to admit air directly into the ash-pit, and those of the other series to admit air directly over the top of the fire, the total area of air-passage through the latter series being less by a fixed proportion than that through the former series, whereby without the employment of regulating-valves the relatively smaller volume of air admitted to the top surface of the fire remains in a constant proportion to that admitted to the ash-pit throughout all variations of pressure or draft, and a series of tubes or blowpipes in said latter series of orifices extending into said chamber, and forming heating-surfaces for the air passing therethrough.

9. In a furnace, a furnace-front having an air-supply chamber, the interior wall of which is exposed to the direct heat of the fire above the grate, and is provided with a series of orifices arranged to admit air directly over the top of the fire to support combustion both when the furnace-doorway is closed and when it is open, and adapted to direct said jets of air so as to prevent outblast of flame through the doorway when it is open.

10. In a furnace, a furnace-front having an air-chamber within it, a wall of which is exposed to the direct heat of the furnace above the bed of fuel, means for admitting air to said chamber, a series of orifices in the wall of said chamber arranged to admit air from the more highly heated part of said chamber over the top of the fire, and orifices for feeding air from the less highly heated part of said chamber to the ash-pit, whereby the air fed to the ash-pit is at a lower temperature than that fed above the grate in order to cool the fire-bars.

11. In a furnace, a furnace-front having an air-chamber within it, a wall of said chamber being exposed to the heat of the furnace, and having a series of openings communicating with the ash-pit, adapted to direct the air upwardly beneath the grate, and means for admitting air to said chamber, whereby heated air is fed to the furnace below the grate.

12. In a furnace, a furnace-front having an air-chamber within it, a wall of said chamber being exposed to the heat of the furnace, and having a series of openings communicating with the ash-pit, means for admitting air to said chamber, whereby heated air is fed to the furnace below the grate, and a deflector for deflecting the air upwardly toward the fire.

13. The combination with a furnace, and means for producing a forced draft thereto, of a means adapted, during the continuance of said forced draft, to institute an inflow of air in the form of jets through the ash-pit doorway when the latter is open, and thereby prevent blowing out of ashes therethrough.

14. In a furnace, a furnace-front having an air-chamber within it, and a series of openings through the wall of said chamber adjacent to the ash-pit door, and directed toward the interior of the ash-pit, whereby the air enters said ash-pit in the form of jets and prevents blowing out of ashes when the ash-pit is opened.

In witness whereof I have hereunto signed my name in the presence of two subscribing witnesses.

SAMUEL CLELAND DAVIDSON.

Witnesses:
GEORGE GOOLD WARD,
HUGH TAYLOR COULTER.